United States Patent
Ehrensberger et al.

[11] Patent Number: 5,904,748
[45] Date of Patent: May 18, 1999

[54] PRODUCTION OF ELEMENTARY VOLATILE METALS BY THERMAL REDUCTION OF THEIR OXIDES WITH THE AID OF ANOTHER METAL

[75] Inventors: Jakob Ehrensberger, Winterthur, Switzerland; Michael Epstein, Rishon Le-Zion; Amnon Yogev, Rehovot, both of Israel

[73] Assignee: Yeda Research and Development Co. Ltd., Rehovot, Israel

[21] Appl. No.: 08/914,258

[22] Filed: Aug. 19, 1997

[30] Foreign Application Priority Data

Aug. 19, 1996 [IL] Israel .......................................... 119087

[51] Int. Cl.$^6$ ............................ C22B 19/20; C22B 26/10
[52] U.S. Cl. ................................ 75/367; 75/590; 75/592; 75/658
[58] Field of Search .............................. 75/367, 589, 590, 75/592, 658, 665; 126/714

[56] References Cited

U.S. PATENT DOCUMENTS

| | | |
|---|---|---|
| 1,925,458 | 9/1933 | Ogg . |
| 1,988,608 | 1/1935 | Ogg . |
| 4,191,558 | 3/1980 | Gould ......................................... 75/592 |
| 4,415,339 | 11/1983 | Aiman et al. ........................... 126/714 |
| 5,454,853 | 10/1995 | Edelson ................................... 75/10.43 |
| 5,645,322 | 7/1997 | Hsu et al. ..................................... 299/5 |

FOREIGN PATENT DOCUMENTS

| | | |
|---|---|---|
| 583 632 | 1/1925 | France . |
| 728 928 | 7/1932 | France . |
| 452 784 | 11/1927 | Germany . |

OTHER PUBLICATIONS

Levitan, Rachel et al., "Closed–loop operation of a solar chemical heat pipe at the Weizmann Institute solar furnace,", Solar Energy Materials, vol. 24, pp. 464–477 (1991).

Primary Examiner—George Wyszomierski
Attorney, Agent, or Firm—Browdy and Neimark

[57] ABSTRACT

Solar process for the production of volatile elemental zinc, sodium, and potassium by reacting their oxides with a reducing metallic agent selected from Fe, Sn, Ni, Co and Mn, and in a second step, reacting carbon or hydrogen with the oxide of said reducing metallic agent so as to reduce it back to its metallic form.

14 Claims, 1 Drawing Sheet

PRODUCTION OF ELEMENTARY VOLATILE METALS BY THERMAL REDUCTION OF THEIR OXIDES WITH THE AID OF ANOTHER METAL

FIELD AND BACKGROUND OF THE INVENTION

The present invention relates to the production of certain volatile elemental metals by means of thermal reduction of their oxides with another metal, where the heat required in the process is obtained from solar radiation.

A variety of processes for producing certain volatile elemental metals by means of thermal reduction of their oxides with another metal have been described in literature, notably in relation to the recovery of elemental zinc from its oxide. In these known processes zinc oxide, iron and carbon are mixed in a suitable reaction vessel, the mixture is heated to an elevated temperature at which the reduction occurs, say about 1500° C., and elemental zinc is recovered in gaseous form from the reaction mixture. Processes of this kind are described, for example, in U.S. Pat. No. 1,925,458, U.S. Pat. No. 1,988,608, FR 583,632, FR 728,928 and DE 452784. In all these known processes there is obtained a gaseous mixture of elemental zinc and carbon oxides with the occurrence of a back reaction in which part of the product zinc and the carbon oxides react with each other with the substantial reformation of the starting zinc oxide ZnO and carbon. Furthermore, the portion of gaseous zinc which does not back-react has to be separated at elevated temperature from the accompanying carbon oxides which further complicate the process.

As was mentioned above, the heat required for the process of the present invention is derived from solar radiation. A major problem associated with this source of energy is its transient nature, being dependent upon both predictable daily and yearly changes, and on unforeseeable factors such as weather conditions (haze, clouds, etc.). A solution to this problem is to be found in using solar energy as process heat and storing the energy for periods of insufficient solar availability. One concept of storing solar energy is based on the utilization of the radiation in solar-driven highly endothermic reactions, and releasing the heat when and where required by the reverse exothermic reaction. In such a case, which will be referred to hereinafter as "a closed loop process", the original products are recovered and are available for recycling. An example of the closed loop concept may be found in the loop of methane reforming, as described by Levitan et al. in Solar Energy Materials, 24, 1–4, pp. 464–477 (1991). Another approach is, to transform solar energy into a manageable, storable energy form, and at the same time conserve natural resources by replacing the process heat conventionally produced from raw materials, by solar energy. The products of such a process are not back-reacted to form the starting materials, but are used as chemical commodities. This type of process will be referred to hereinafter as "an open loop process".

SUMMARY OF THE INVENTION

It is an object of the present invention to provide a novel process for the conversion of solar radiation into storable and utilizable energy.

It is another object of the invention to provide an improved process for the production of certain volatile elemental metals by thermal reduction of their oxides by means of a metallic reducing agent, free of the prior art shortcomings.

It is a further object of the present invention to provide a novel process for the production of fuel gases such as carbon monoxide and hydrogen.

In accordance with the present invention there is provided a process for the production of an elemental volatile metal M being a member selected from the group consisting of Zn, Na and K, wherein an oxide of said volatile metal M is reacted in the heat with a first reducing agent R being a metal selected from the group of Fe, Sn, Ni, Co and Mn, or with a mixture of such reducing agents, to yield said volatile metal M in elemental gaseous form together with an oxide of R, and said oxide of R is reduced with a second reducing agent R' being carbon or hydrogen to yield back said reducing agent R, characterized in that solar radiation is used as the energy source for the process, and further characterized in that the process is carried out in two steps, in the first of which the oxide of said volatile metal M is reacted with said first reducing agent R to produce said volatile metal M in gaseous form together with a non-gaseous oxide of R, and in a second step said oxide of R is reacted with said second reducing agent R', to yield R and R'O; and R is recycled to the first step.

The reactions taking place in each of the above two steps may be represented by the following equations which for the sake of simplicity are written in non-stoichiometric form disregarding the valencies of M and R:

Step 1—MO+R→M+RO

Step 2—RO+R'→R+R'O where M is a metal selected from the group of Zn, Na and K, R is a metal selected from the group of Fe, Sn, Ni, Co and Mn and R' is carbon or hydrogen.

The temperatures at which steps 1 and 2 are carried out depend on the nature of the metals M and R. As a rule these temperatures will be within the range of 900–1800° C.

When carbon is used as the second reducing agent of the process, it may be introduced as such e.g. in the form of elemental carbon such as coal or charcoal, or it may be produced in situ, e.g. by pyrolysis of pyrolyzable carbonaceous material such as methane, ethane, propane, butane, biomass, fossil fuel and the like. The pyrolysis of such carbonaceous materials also yields hydrogen and, depending on the nature of the pyrolyzable material, also volatile hydrocarbons, both of which may be used as fuel or for other industrial purposes.

The in situ pyrolysis of pyrolyzable carbonaceous material may be conducted either in a pyrolyzer from which carbon obtained is transferred to the reaction vessel in which the process of the invention is carried out, or alternatively in the reaction vessel itself.

As mentioned hereinbefore, the energy required for the performance of the above process is derived from solar radiation. Preferably, all energy requirements for this process are being provided by concentrated solar radiation, but it should be understood that the present invention also encompasses any embodiment by which only part of the energy required in the above process is provided by concentrated solar radiation, while the rest is provided by using conventional energy sources as known per se. An example of such a case may be when solar radiation is being utilized only in one of the process' steps.

According to a preferred embodiment of the invention, one or more reactors used in the process (including, where applicable, a reactor for the pyrolysis of a pyrolyzable carbonaceous material) are capable of directly admitting concentrated solar radiation, and concentrated solar radiation is radiated directly on the reactants therein.

By another aspect of the invention, there is provided a process for the production of fuel gases, such as carbon monoxide, other carbonaceous fuels depending on the type of the carbonaceous material used as the second reducing agent R', hydrogen, and the like. When the second reducing agent R' is carbon, the products of step 2 of the above described process will be R and CO. These two products are separated, R is recycled to react according to step 1 of the process, whereas carbon monoxide may be used in any desired way, as will further be explained.

According to yet a further aspect of the present invention, the process further comprises a step in which the elemental volatile metal M is reacted with water, yielding an oxide of the volatile metal and hydrogen. The first product is being recycled to react according to step 1 of the above described process, whereas the latter product is withdrawn as a chemical commodity, the last two aspects of the invention demonstrate the two basic concepts for transforming solar energy into usable, storable energy form, namely the open and closed loops as was previously explained. The two steps' process of the present invention, is an example of the open loop concept, whereby solar radiation is used as the energy source for one or both endothermic reactions, and the products being the elemental volatile metal M and R'O are being removed from the process. When the aforementioned further step is added, the process may be considered as an example of the closed loop concept, in which the elemental volatile metal M and the first reducing agent R are being recycled, whereas R'O (e.g. CO) and $H_2$ are being produced and withdrawn from the process.

In accordance with the invention there is provided a process for the production of substantially pure metal M, using concentrated solar radiation as heat source, which comprises:

i) providing first and second solar reactors;

ii) forming in said first solar reactor a reaction mixture including an oxide of the metal M and a first reducing agent R;

iii) introducing concentrated solar radiation into said first and second solar reactors to establish therein a desired reaction temperature;

iv) allowing a reduction/oxidation reaction to proceed and separately withdrawing as products vaporous metal M and non-gaseous oxide of said first reducing agent R;

v) withdrawing an oxide RO of said first reducing agent from the first solar reactor and conducting it into said second solar reactor concurrently with second reducing agent R', allowing a reduction/oxidation reaction to proceed and separately withdrawing as products said first reducing agent R and an oxide R'O of said second reducing agent;

vi) recycling the so obtained first reducing agent R from said second solar reactor to said first solar reactor; and vii) condensing vaporous metal M withdrawn from said first solar reactor and withdrawing liquid metal M as product.

Concentrated solar radiation may be introduced into the solar reactor in any of several conventional ways. For example, the solar reactor may be made of suitable transparent, heat-resistant material such as quartz or have a window of such material, or concentrated solar radiation may be introduced into an opaque reactor via a suitable heat-resistant light guide. Alternatively, an opaque reactor may be heated externally by concentrated solar radiation in which case the reactants are heated indirectly.

In a specific embodiment of the invention, carbon used as the second reducing agent may be produced in situ from pyrolyzable carbonaceous material such as, for example, a biomass or fossil fuel. In applying this variant to a specific embodiment for the production of elemental zinc with the aid of concentrated solar radiation according to the process described above, the operation comprises using a further solar reactor serving as pyrolyzer, feeding a pyrolyzable carbonaceous material into said further solar reactor, introducing concentrated solar energy into said further solar reactor to establish therein a desired reaction temperature, separately withdrawing therefrom as products carbon and a gaseous mixture of hydrogen and hydrocarbons and feeding the product carbon into said second solar reactor. If desired, the gaseous mixture withdrawn from the further solar reactor may be subjected to a separation operation for the separate recovery of hydrogen and hydrocarbons, each of which may be used for purposes and in manners known per se.

Elemental zinc obtained in accordance with the above embodiment may be used in metallurgy; for the generation of electric energy in a storage battery or fuel cell, or be reacted with water to produce zinc oxide and hydrogen.

The carbon monoxide withdrawn at the second step of the process when carbon is used as the second reducing agent R', may be utilized as a fuel, for example in the generation of electricity or in any other applications known per se. The carbon dioxide obtained by the combustion of carbon monoxide may be utilized industrially.

In addition or in the alternative, all or some of the carbon monoxide obtained as product at the second step of the process may be subjected to a gas-water shift by reaction with water to produce carbon dioxide and hydrogen, both products being utilizable for purposes and in manners known per se.

For the performance of the embodiment of the invention which makes use of concentrated solar radiation and in which said metal M is zinc, the invention further provides an installation comprising first and second solar reactors, means for introducing concentrated solar radiation into said first and second solar reactors to establish therein desired reaction temperatures; means for forming within said first solar reactor a reaction mixture containing zinc oxide and iron; means for withdrawing from said first solar reactor vaporous zinc; heat exchange means for condensing withdrawn vaporous zinc into liquid zinc; means for conducting iron oxide from said first to said second solar reactor; means for recycling iron from said second to said first solar reactor; and means for withdrawing carbon monoxide from said second solar reactor.

In addition, the invention provides an installation as set out above, further comprising a third solar reactor, means for introducing concentrated solar radiation into said third solar reactor to establish therein desired reaction temperature; means for feeding into said third solar reactor pyrolyzable carbonaceous material; means for withdrawing carbon from said third solar reactor and cycling it into said second solar reactor; and means for withdrawing a gaseous mixture of hydrogen and hydrocarbons from said third solar reactor.

Zinc oxide formed in electric batteries and fuel cells in the course of the generation of electricity, or by a reaction of elemental zinc with water to produce hydrogen, may be recycled to said first solar reactor.

The first step of the process of the invention is carried out by mixing in a reaction vessel the metal oxide particles with the first reducing agent which is either in a powder or a molten state. The mixture is heated-up to a temperature of about 1200 to 1700° C., allowing the reaction of step 1 to take place. This step of the process is endothermic, but nevertheless some of the energy input to this reaction may be recovered from the coolant used for condensation of the vaporous metal M leaving the reaction vessel, and be used in any process step or for any other desired purpose. The metal used as the first reducing agent is so chosen as to ensure that in its oxidized form and at the temperature in which the first step is carried out, RO is not gaseous.

In the second step, second reducing agent R' is fed with the oxidized first reducing agent at a temperature of about 1200–1700° C., the precise temperature depending on the type of said first reducing agent used.

The solar radiation used for providing the reaction heat, solar radiation is concentrated by a concentrating dish or a central receiver. Where such concentrators are insufficient for providing the required elevated temperatures, a secondary concentrating device such as a compound parabolic concentrator (CPC) may be used.

When solar radiation is used as the energy source for the process, the solar reactors are preferably of a kind which enable direct absorption of solar energy whereby the thermal efficiency of the process is enhanced.

Since the two steps' process is a complete cycle as regards the first reducing agent R, it may be carried out in several modes. For example, both process steps may be performed batchwise in a single vessel, the oxide RO formed in the first step by reaction of MO with R being left in the vessel after completion of the first step and R' being added thereto. Upon completion of the second step R remains in the vessel and fresh MO is added. Alternatively, two separate vessels may be used, one for each step, the oxide RO formed in the first vessel being withdrawn and conducted to the second vessel for reaction with R', and the R formed in the second vessel being recycled to the first one.

In the performance of the process according to the invention fluidized bed technology may be employed in either of the two steps as well as in the pyrolysis of carbonaceous material.

DESCRIPTION OF THE DRAWINGS

For better understanding the invention will now be described with reference to the annexed FIG. 1 which is a block diagram of a preferred embodiment of the invention.

DESCRIPTION OF A PREFERRED EMBODIMENT

Figure 1:
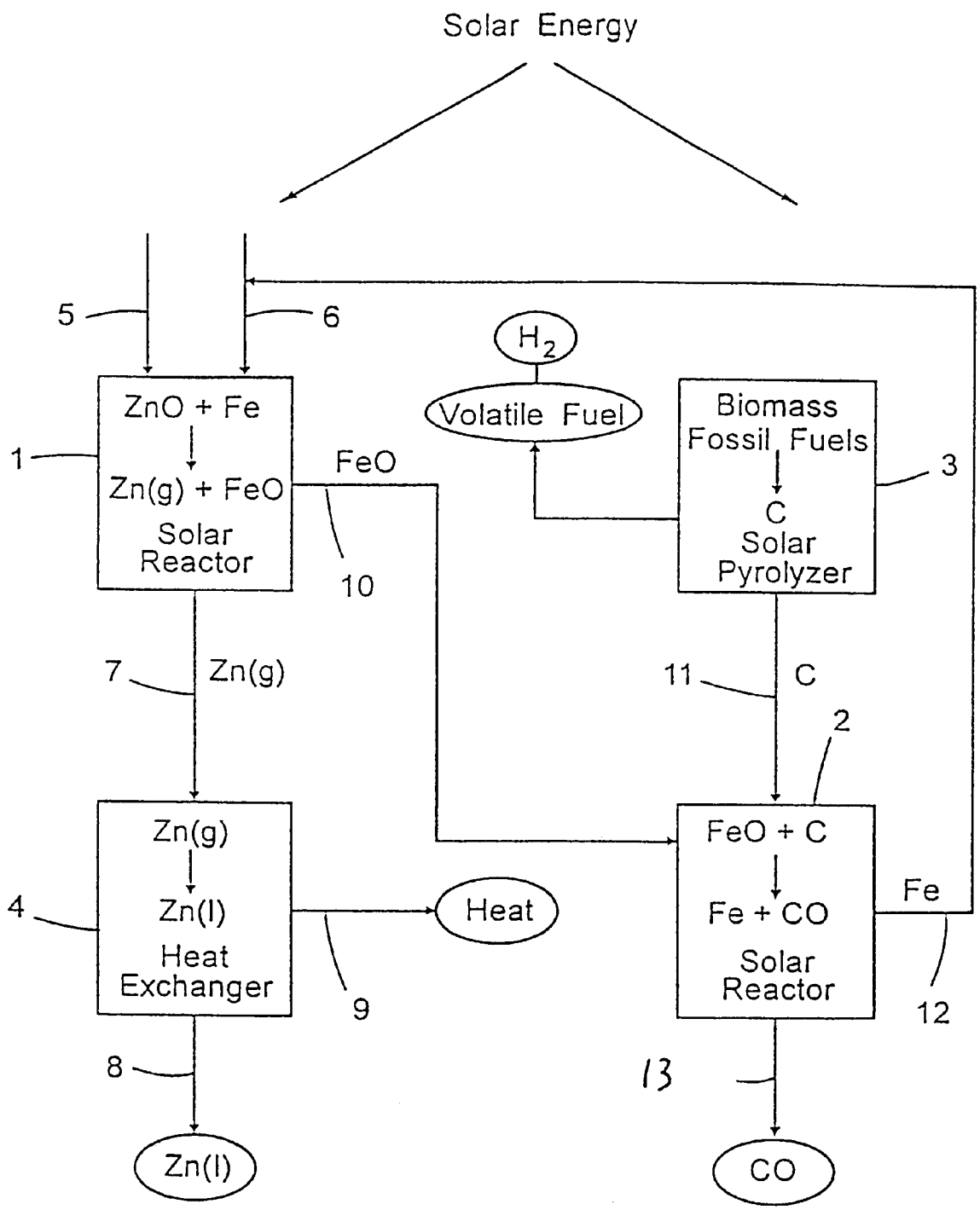

The process diagrammatically shown in FIG. 1 concerns the production of elemental zinc from zinc oxide with the utilization of concentrated solar energy as heat source. As shown, this process is carried out in an installation comprising first, second and third solar reactors designated respectively by the numerals 1, 2 and 3 all designed for the admission of concentrated solar radiation in order to establish therein desired reaction temperatures The installation further comprises heat exchanger means 4.

In operation comminuted zinc oxide and iron powder are fed via feeders 5 and 6 into the first solar reactor 1 where a reduction/oxidation reaction takes place yielding gaseous zinc and non-gaseous iron oxide. The gaseous zinc is withdrawn via ducting means 7 into the condenser 4 wherefrom liquid zinc is withdrawn at 8 and utilizable heat at 9.

Iron oxide is withdrawn from reactor 1 and conducted via ducting means 10 to the second reactor 2 which is concurrently charged with carbon arriving from the third solar reactor 3 which serves as pyrolyzer. Inside the second solar reactor 2 a reduction/oxidation reaction takes place between iron oxide and carbon yielding iron and gaseous carbon oxide. The latter is withdrawn at 13 as a further product of the process and the former is withdrawn through ducting means 12 and recycled into reactor 1 via feeder 6.

Carbon which is charged into reactor 2 via ducting means 11 is produced in situ in the solar reactor 3 from a pyrolyzable carbonaceous material such as a biomass or fossil fuel. Together with carbon, the pyrolysis in the solar reactor 3 produces a gaseous mixture of hydrogen and volatile fuel, the latter being essentially a mixture of hydrocarbons.

The liquid zinc withdrawn from the heat exchanger 4 may be allowed to solidify to yield said elemental solid.

Where it is desired to use the above zinc production as a vehicle for the conversion of solar radiation into utilizable energy, the zinc may be used in a fuel cell or a battery for the generation of electricity. In the alternative or in addition, some or all of the product zinc may be hydrolyzed to yield zinc oxide and hydrogen which is withdrawn as product from the operation and may be utilized either in chemical synthesis or as fuel. In any of these uses or zinc, zinc oxide is obtained which may be recycled into the first solar reactor 1.

Carbon monoxide withdrawn from the second reactor 2 may be used as fuel by burning it into carbon dioxide for example, in the generation of electricity by driving a gas turbine coupled to an electricity generator, and the resulting $CO_2$ may also be used commercially.

In the alternative or in addition, all or part of the carbon monoxide withdrawn from the second reactor 2 may be subjected to a so-called gas-water shift reaction with water in accordance with the equation

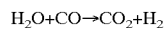

$H_2$ and $CO_2$ being withdrawn as products, each of which may be used in manners specified herein.

The invention will now be further illustrated by the following working examples to which it is not limited.

EXAMPLES

Example 1

A mixture of 2 gr of zinc oxide (ZnO) and 4 gr of iron (Fe) was fed under a flow of Argon into an alumina tube (99.7$Al_2O_3$). The tube was heated in a solar furnace providing 6 KW heat at a solar concentration of 3000 times the ambient radiation, for 10 minutes, allowing the inner bed to reach a temperature of 1200° C. The bed was left for another 10 minutes at the final temperature. The cases leaving the reactor passed through a cold finger which ensured that their temperature is decreased to well below 907° C. 0.5 gr of Zn was collected which corresponds to about 30% of the theoretical yield when full conversion is assumed.

Example 2

A second experiment similar to the above described one was performed. In this experiment the bed temperature, reached 1590° C. after 15 minutes. This temperature was maintained for another 10 minutes and 1.5 gr Zn were collected at the cold finer. This result corresponds to over 90% of the theoretical yield. An X-ray diffraction analysis indicated that the Zn is of high purity and crystallinity. In an X-ray diffraction analysis of the residuals left in the alumina tube, they were found to contain mainly FeO, Fe, and some ZnO and Zn.

Example 3

The same experimental set-up described in example 1 was used for carrying out the second step of the process. A mixture of 1.7 gr FeO and 0.6 gr carbon black was heated up within 15 minutes to 1590° C. Following a 10 minutes period in which the mixture was left at said temperature, 1.3 gr of Fe were obtained. Therefore, it was demonstrated that all the quantity of Fe introduced to the reactor in the form of FeO was recovered.

Example 4

The experimental set-up described in example 1 was used for carrying out a process for the production of elemental zinc using tin as the reducing agent. A mixture of 2 gr zinc oxide (ZnO) and 8 gr of tin (Sn) was fed under a flow of Argon into the alumina tube. The tube was heated in a solar furnace for 10 minutes, allowing the inner bed to reach a temperature of 1250° C. Then the bed was left for another 15 minutes at the final temperature. The gases leaving the reactor were condensed while passing through a cold finger and 1.0 gr of Zn and 0.5 gr of ZnO were collected. Running the same experiment at a final bed temperature of 1500° C. yielded a mixture comprising: 38% of Zn, 38% of ZnO, 20% of $SnO_2$ and 4% of $Zn_2SnO_4$, all percentages are given as weight percentages.

Example 5

The above-described experimental set-up was used for carrying out the second step of the process. A mixture of 6.3 gr $SnO_2$ and 0.5 gr carbon black was heated up within 15 minutes to 1200° C. Following a 10 minutes period in which the mixture was left at said temperature, 4.9 gr of Sn were obtained. Therefore, it was demonstrated that all the quantity of Sn introduced to the reactor in the form of $SnO_2$, was recovered.

Example 6

A similar experiment to the one described in Example 1, was performed. In this experiment a mixture of 2 gr sodium oxide ($Na_2O$) and 4 gr of iron (Fe) was fed into the alumina tube which was heated in a solar furnace for 20 minutes allowing the inner bed to reach a temperature of 1500° C. 1.0 gr of Na was collected which corresponds to about 70% of the theoretical yield when full conversion is assumed.

We claim:

1. A process for the production of an elemental volatile metal M selected from the group consisting of Zn, Na and K, comprising reacting an oxide of said volatile metal M with a first reducing agent R selected from the group consisting of Fe, Sn, Ni, Co and Mn, or with a mixture of such reducing agents, with application of heat, to yield said volatile metal in elemental gaseous form together with an oxide of R, reducing said oxide of R with a second reducing agent R' selected from the group consisting of carbon and hydrogen to yield back said reducing agent R, wherein the process is carried out in two reaction steps and one recycling step, in the first reaction step of which the oxide of said volatile metal M is reacted with said first reducing agent R to produce said volatile metal M in gaseous form together with a non-gaseous oxide of R, and in the second reaction step of which said oxide of R is reacted with said second reducing agent R', to yield R and R'O; and in said recycling step said reducing agent R is recycled to the first reaction step, and solar radiation is used as a heat source in said first and second reaction steps.

2. The process of claim 1, wherein said second reducing agent R' is carbon.

3. The process of claim 2, wherein the carbon used in said second step is produced in situ by pyrolysis of a pyrolyzable carbonaceous material.

4. A process for the production of substantially pure metal M according to claim 3, comprising:

i) providing first and second solar reactors;

ii) forming in said first solar reactor a reaction mixture including an oxide of the metal M and a first reducing agent R;

iii) introducing concentrated solar radiation into said first and second solar reactors to establish therein a desired reaction temperature;

iv) allowing a reduction/oxidation reaction to proceed and separately withdrawing as products vaporous metal M and non-gaseous oxide of said first reducing agent R;

v) withdrawing an oxide RO of said first reducing agent from the first solar reactor and conducting it into said second solar reactor concurrently with second reducing agent R', allowing a reduction/oxidation reaction to proceed and separately withdrawing as products said first reducing agent R and an oxide R'O of said second reducing agent;

vi) recycling the so obtained first reducing agent R from said second solar reactor to said first solar reactor; and vii) condensing vaporous metal M withdrawn from said first solar reactor and withdrawing liquid metal M as product.

5. The process of claim 2, wherein concentrated solar radiation is absorbed directly by reactants in one or both of said first and second steps.

6. The process of claim 2, further comprising reacting said elemental volatile metal with water, to yield an oxide of said volatile metal, and hydrogen.

7. A process for the production of substantially pure metal M according to claim 1, comprising:

i) providing first and second solar reactors;

ii) forming in said first solar reactor a reaction mixture including an oxide of the metal M and a first reducing agent R;

iii) introducing concentrated solar radiation into said first and second solar reactors to establish therein a desired reaction temperature;

iv) allowing a reduction/oxidation reaction to proceed and separately withdrawing as products vaporous metal M and non-gaseous oxide of said first reducing agent R;

v) withdrawing an oxide RO of said first reducing agent from the first solar reactor and conducting it into said second solar reactor concurrently with second reducing agent R', allowing a reduction/oxidation reaction to proceed and separately withdrawing as products said first reducing agent R and an oxide R'O of said second reducing agent;

vi) recycling the so obtained first reducing agent R from said second solar reactor to said first solar reactor; and vii) condensing vaporous metal M withdrawn from said first solar reactor and withdrawing liquid metal M as product.

8. The process of claim 7, wherein said second reducing agent is carbon.

9. The process of claim 8, comprising using a third solar reactor serving as pyrolyzer, feeding a pyrolyzable carbonaceous material into said third solar reactor, introducing concentrated solar radiation into said third solar reactor to establish therein a desired reaction temperature, withdrawing as product therefrom carbon and a gaseous mixture of hydrogen and hydrocarbons, and feeding the product carbon into said second reactor.

10. The process of claim 1, wherein concentrated solar radiation is absorbed directly by reactants in one or both of said first and second steps.

11. The process of claim 1, further comprising reacting said elemental volatile metal with water, to yield an oxide of said volatile metal, and hydrogen.

12. A process for the production of substantially pure metal M according to claim 1, comprising:

i) providing first and second solar reactors;

ii) forming in said first solar reactor a reaction mixture including an oxide of the metal M and a first reducing agent R;

iii) introducing concentrated solar radiation into said first and second solar reactors to establish therein a desired reaction temperature;

iv) allowing a reduction/oxidation reaction to proceed and separately withdrawing as products vaporous metal M and non-gaseous oxide of said first reducing agent R;

v) withdrawing an oxide RO of said first reducing agent from the first solar reactor and conducting it into said second solar reactor concurrently with second reducing agent R', allowing a reduction/oxidation reaction to proceed and separately withdrawing as products said first reducing agent R and an oxide R'O of said second reducing agent;

vi) recycling the so obtained first reducing agent R from said second solar reactor to said first solar reactor; and vii) condensing vaporous metal M withdrawn from said first solar reactor and withdrawing liquid metal M as product.

13. The process of claim 12, wherein said second reducing agent is carbon.

14. The process of claim 13, comprising using a third solar reactor serving as pyrolyzer, feeding a pyrolyzable carbonaceous material into said third solar reactor, introducing concentrated solar radiation into said third solar reactor to establish therein a desired reaction temperature, withdrawing as product therefrom carbon and a gaseous mixture of hydrogen and hydrocarbons, and feeding the product carbon into said second reactor.

* * * * *